United States Patent [19]

Hanson

[11] Patent Number: 5,222,368

[45] Date of Patent: Jun. 29, 1993

[54] METHOD OF OPERATING A TRANSPORT REFRIGERATION UNIT

[75] Inventor: Jay L. Hanson, Bloomington, Minn.

[73] Assignee: Thermo King Corporation, Minneapolis, Minn.

[21] Appl. No.: 976,105

[22] Filed: Nov. 13, 1992

Related U.S. Application Data

[62] Division of Ser. No. 728,465, Jul. 11, 1991.

[51] Int. Cl.[5] ............................................. F25B 49/00
[52] U.S. Cl. ....................................... 62/126; 62/129; 62/230; 62/323.1; 123/198 D
[58] Field of Search ................. 62/126, 129, 133, 230, 62/323.1, 323.4; 123/198 D, 196 S

[56] References Cited

U.S. PATENT DOCUMENTS

| | | | |
|---|---|---|---|
| 4,324,286 | 4/1982 | Brett | 62/133 X |
| 4,995,357 | 2/1991 | Gonnering et al. | 123/196 S X |
| 5,070,832 | 12/1991 | Hapka et al. | 123/198 D |

Primary Examiner—John Rivell
Attorney, Agent, or Firm—M. J. Moran

[57] ABSTRACT

A method of detecting conditions during the operation of a transport refrigeration unit (20) which may cause shutdown, and then modifying the operation of the unit in an attempt to find an operating condition that will keep the unit operating safely. The unit includes a compressor (26) driven by an engine (30) operable at low and high speeds. Upon detecting (264) an over-temperature condition of the engine a first modification (282) is initiated, including switching the engine to low speed. If the engine temperature does not drop to a safe value (288, 292), a second modification (296) is initiated. If the engine was in low speed (280) when the over-temperature condition was detected, the second modification is initiated immediately. Upon detecting (314) a low oil pressure condition, the engine is switched (316) to high speed. If the oil pressure rises to a safe level, engine operation is continued at high speed. Appropriate alarms (326) accompany the modified operating conditions.

3 Claims, 5 Drawing Sheets

METHOD OF OPERATING A TRANSPORT REFRIGERATION UNIT

This is a division of application Ser. No. 07/728,465 filed Jul. 11, 1991 now pending.

TECHNICAL FIELD

The invention relates in general to transport refrigeration units, and more specifically to transport refrigeration units which have microprocessor based electrical control.

BACKGROUND ART

U.S. Pat. No. 4,663,725, which is assigned to the same assignee as the present application, discloses the use of microprocessor based transport refrigeration control for use with a refrigerated container, with the refrigerant compressor being driven by an electric motor. This patent is directed primarily to the use of a microprocessor to operate the various components of the refrigeration system according to predetermined algorithms, and to detect and record faults which occur during the operation thereof.

U.S. Pat. No. 4,918,932, which is assigned to the same assignee as the present application, discloses the use of a microprocessor to determine average error between an operator selected set point temperature and the temperature of a space to be conditioned, using the outputs of return air and discharge air sensors. The average error is then used in the determination of an error signal which modulates the capacity of the system.

While these patents ably utilize the capabilities of a microprocessor in controlling the operation of a transport refrigeration system, it would be desirable, and it is an object of the present invention, to expand the use of the microprocessor which controls the unit to provide additional services in the area of unit fault conditions.

SUMMARY OF THE INVENTION

The invention is a method of modifying the operation of a refrigeration unit, when a condition is detected which may result in shutdown of the unit, in an attempt to find a safe operating condition which will keep the unit operating. The refrigeration unit includes a refrigerant compressor driven at low and high speeds by an internal combustion engine. The method includes the steps of monitoring the temperature of the engine, detecting a predetermined over-temperature condition, and initiating a first modification phase which may result in modification of the current operating mode of unit 20. The first modification phase includes the step of switching the engine to low speed, when it is in high speed at the time the predetermined over-temperature condition is detected, and the step of determining if the engine temperature has dropped below a predetermined value, after the step of switching to low speed. If the temperature does not drop below the predetermined value, a second modification phase is initiated. If the engine is in low speed when the over-temperature condition is detected, the second modification phase is initiated immediately.

In a preferred embodiment of the invention, the second modification phase includes the step of switching the refrigeration unit to full suction line modulation, if the unit is not already in full modulation.

In another embodiment of the invention, the method includes the steps of monitoring the temperature and the level of the engine coolant, with the steps of initiating the first and second modifications in the operation of the unit taking place only if the level of the engine coolant exceeds a predetermined value.

In another embodiment of the invention, the method includes the step of monitoring the engine oil pressure. Upon finding the engine oil pressure below a predetermined value, the method includes the steps of determining if the engine is currently operating at the lower of the two operating speeds. If the engine is operating at low speed, the method attempts to prevent shutdown by the steps of switching the engine to high speed and determining if the oil pressure is still below the predetermined value. If the engine oil pressure has now risen to, or above, the predetermined value, instead of shutting the engine down, the engine is continuously operated at high speed. Appropriate alarms are generated to inform the operator of modified operating conditions.

In an embodiment of the oil pressure checking method, the invention also checks the oil level of the engine, with the step of switching the engine to high speed taking place only when the oil level is above a predetermined level. Finding the engine already at the higher of the two operating speeds, or finding the oil level is low, results in the step of initiating engine shut down.

Thus, in addition to detecting certain engine faults which may result in shutdown of the prime mover, and thus shutdown of the transport refrigeration unit, the present invention sets forth methods which modify the operation of the engine and/or the associated refrigeration unit, in an attempt to find a modified operating condition of the engine and/or refrigeration unit which will prevent shutdown. If the engine is allowed to continue to operate in a modified operating condition, appropriate alarms are generated which notify the operator that one or more operating conditions have been modified, and to check the reason for the modified operation. The alarms identify specific items which should be checked i.e., engine oil or engine coolant. If the engine is shut down, other alarms are generated which inform the operator as to the nature of the cause which initiated shutdown.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
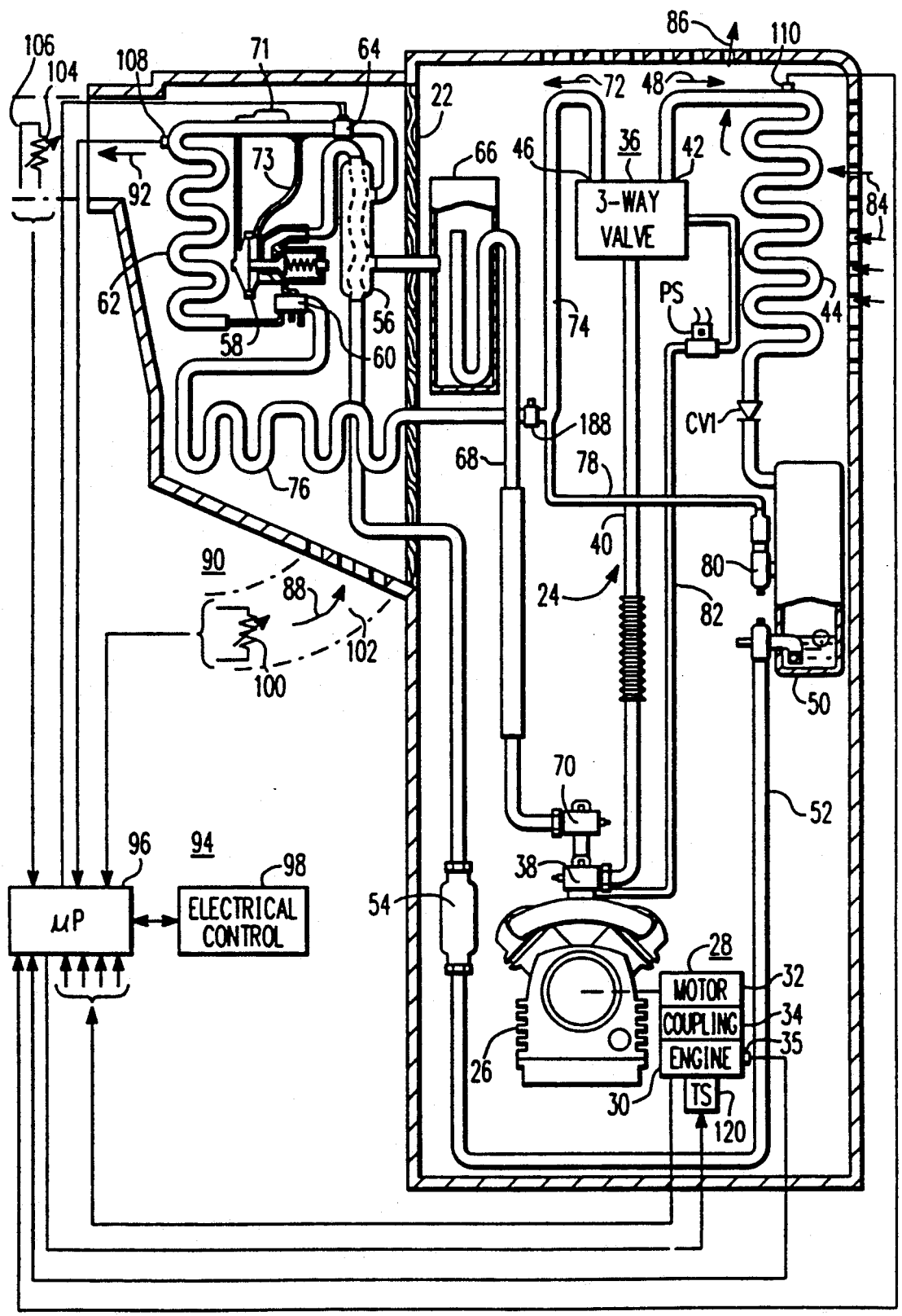
FIG. 1 is a partially block and partially schematic diagram of a transport refrigeration system having a refrigerant compressor driven by an internal combustion engine, which may utilize the methods of the invention.

Referring now to the drawing, and to FIG. 1 in particular, there is shown a transport refrigeration unit 20 which may utilize the methods of the invention. Refrigeration unit 20 may be mounted on a container, truck, or trailer, such as on a wall 22 thereof, for example. Refrigeration unit 20 has a closed fluid refrigerant circuit 24 which includes a refrigerant compressor 26 driven by a prime mover arrangement 28. Prime mover arrangement 28 includes an internal combustion engine 30, and it may optionally include a stand-by electric motor 32. Engine 30 and motor 32 are coupled to compressor 26 by a suitable clutch or coupling 34 which disengages engine 30 while motor 32 is operative. A selector 35 selects one of the two prime movers and provides an output signal to identify the selection.

Discharge ports of compressor 26 are connected to an inlet port of a three-way valve 36 via a discharge service valve 38 and a hot gas line 40. The functions of three-way valve 36, which selects heating and cooling cycles, may be provided by two separate valves, if desired. Three-way valve 36 has a first output port 42, which is selected to initiate a cooling cycle, with the first output port 42 being connected to the inlet side of a condenser coil 44. Three-way valve 36 has a second outlet port 46, which is selected to initiate a heating cycle, as will be hereinafter described.

When three-way valve 36 selects the cooling cycle output port 42, it connects compressor 26 in a first refrigerant circuit 48, which in addition to condenser 44, includes a one-way condenser check valve CV1, a receiver 50, a liquid line 52, a refrigerant drier 54, a heat exchanger 56, an expansion valve 58, a refrigerant distributor 60, an evaporator coil 62, an optional controllable suction line modulation valve 64, another path through heat exchanger 56, an accumulator 66, a suction line 68, and back to a suction port of compressor 26 via a suction line service valve 70. The operative prime mover may be protected against overload by controlling modulation valve 64 to provide the function of a conventional compressor throttling valve, as taught by U.S. Pat. No. 4,977,751, which is assigned to the same assignee as the present application; or, a conventional compressor throttling valve may be disposed in suction line 68, as desired. Expansion valve 58 is controlled by a thermal bulb 71 and an equalizer line 73.

When three-way valve 36 selects the heating cycle output port 46, it connects compressor 26 in a second refrigerant circuit 72. The second refrigerant circuit 72 by-passes condenser 44 and expansion valve 58, connecting the hot gas output of compressor 26 to the refrigerant distributor 60 via a hot gas line 74 and a defrost pan heater 76. A hot gas by-pass solenoid valve 77 may optionally be disposed in hot gas line 74. A by-pass or pressurizing line 78 connects hot gas line 74 to receiver 50 via by-pass and check valves 80, to force refrigerant from receiver 50 into an active refrigerant circuit during heating and defrost cycles.

A conduit or line 82 connects three-way valve 36 to the low side of compressor 26 via a normally closed pilot solenoid valve PS. When solenoid valve PS is deenergized and thus closed, three-way valve 18 is spring biased to select the cooling cycle output port 42. When evaporator 62 requires defrosting, and when the load being conditioned requires heat to maintain set point, pilot solenoid valve PS is energized to allow the low pressure side of compressor 26 to operate three-way valve 36 to select the heating cycle output port 46.

A condenser fan or blower (not shown) causes ambient air 84 to flow through condenser coil 44, with the resulting heated air 86 being discharged to the atmosphere. An evaporator fan or blower (not shown) draws air 88, called "return air", from a served space 90 whose air is to be conditioned, through the evaporator coil 62, and the resulting cooled or heated air 92, called "discharge air", is returned to the space 90. During an evaporator defrost cycle, the evaporator fan or blower is not operated, and a defrost air damper may be operated to close the discharge air path to the conditioned space 90.

Transport refrigeration unit 20 is controlled by microprocessor based electrical control 94 which includes a microprocessor 96 and electrical control 98. Electrical control 98 includes relays, and the like, as will be explained relative to FIGS. 2A and 2B. The microprocessor 96 receives input signals from appropriate sensors, such as from a return air temperature sensor 100 disposed in a suitable return air path 102, a discharge air temperature sensor 104 disposed in a suitable discharge air path 106, from a coil temperature sensor 108 disposed to sense the temperature of the evaporator coil 62, from a refrigerant pressure sensor (HPCO) 110 disposed on the high side of the refrigerant circuit 48, and from various engine sensors shown in FIG. 2B, such as oil level sensor 112 oil pressure sensor 114, engine coolant level sensor 115, engine coolant temperature sensor 116, and engine speed sensor 118.

Microprocessor 96, among other things, controls modulation valve 64, hot gas solenoid valve 77, and a throttle or high speed solenoid 120. Other functions controlled by microprocessor 96 are shown in FIGS. 2A and 2B, and will be hereinafter described.

Figure 2A:
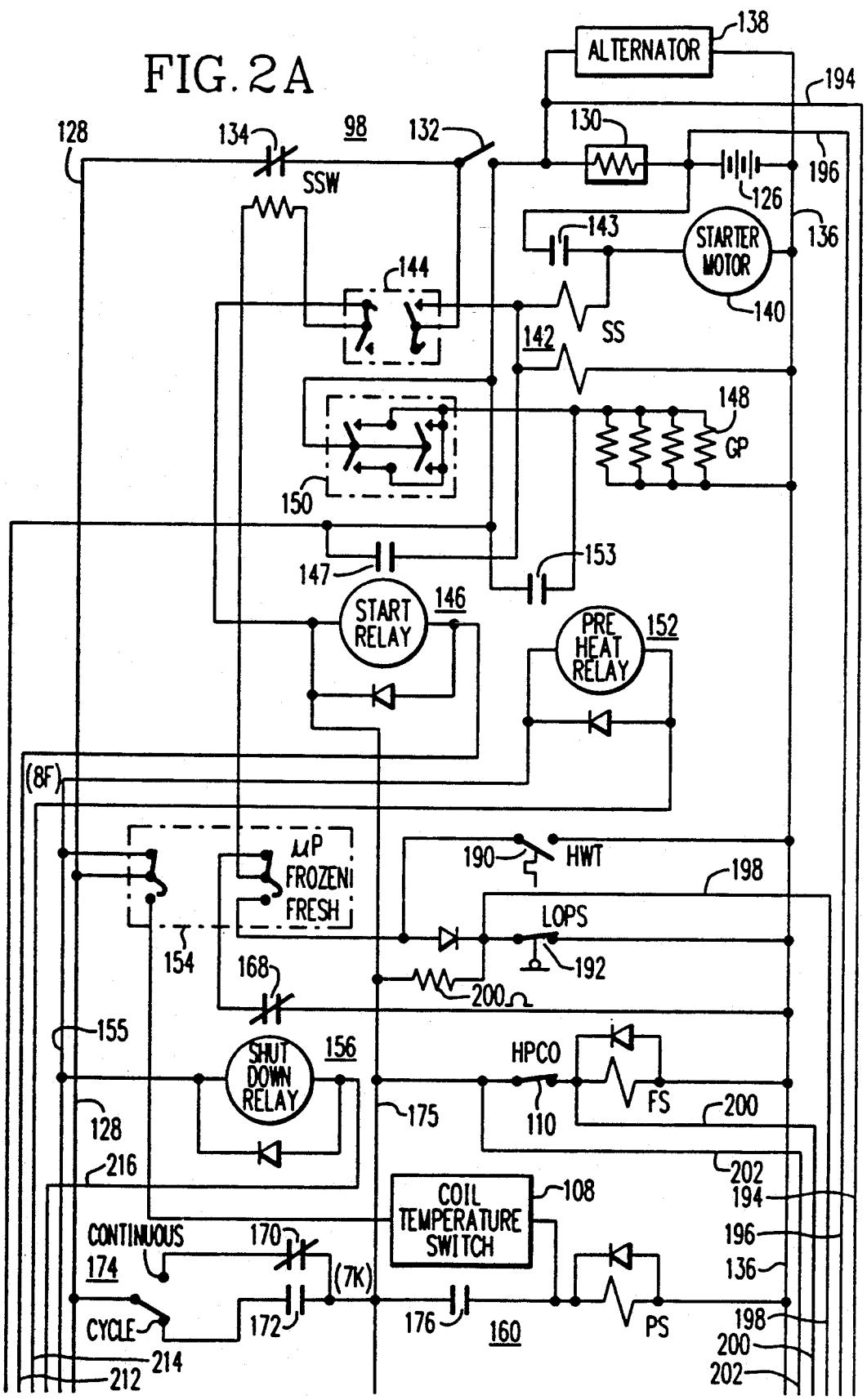
FIGS. 2A and 2B may be assembled to provide an electrical schematic diagram of microprocessor based electrical control shown in block form in FIG. 1.
Figure 2B:
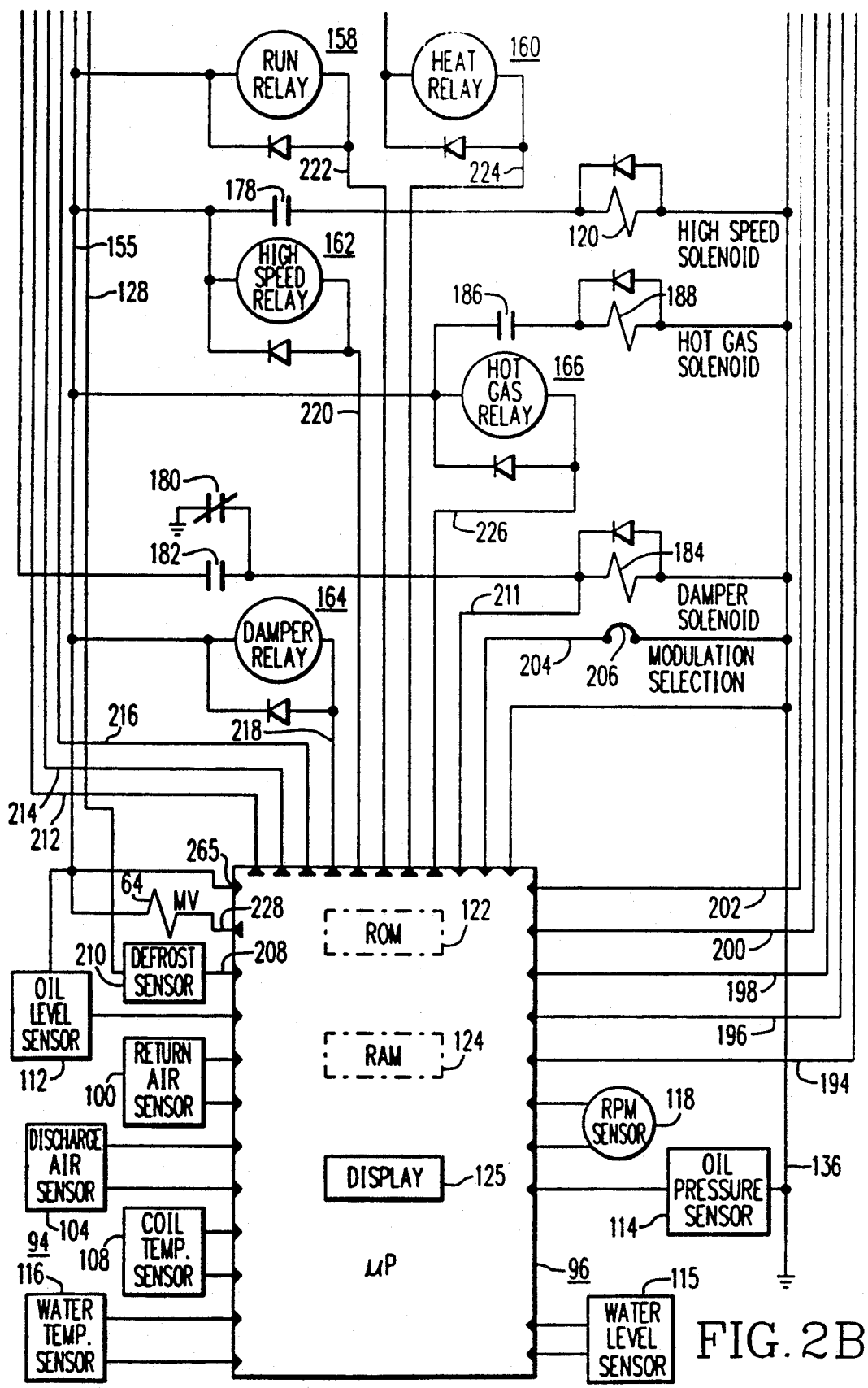

FIGS. 2A and 2B may be assembled to provide a detailed schematic diagram of microprocessor based electrical control 94, which includes microprocessor 96 and control 98. As is well known, microprocessor 96 includes a read-only memory (ROM) 122 for storing programs to be hereinafter described, and a random access memory (RAM) 124 for software timers, flags, input signals, output signals, and other values generated by the operating programs. Microprocessor 96 also includes a display 125 for displaying fault codes, system status indicating lights, and the like.

Electrical control 98 includes a battery 126 which has one side connected to a first conductor 128 via a DC shunt 130, an on-off switch 132, and normally closed contacts 134 of a protective reset switch SSW. The remaining side of battery 126 is connected to conductor 136, which is grounded. Control 98 further includes an alternator 138 driven by prime mover 28; a starter motor 140, for cranking engine 30, which is controlled by a starter solenoid 142 having associated normally open contacts 143, an ignition switch 144, and a start relay 146 having associated normally open contacts 147; and glow plug resistors (GP) 148, for pre-heating engine 30, which are controlled by a pre-heat switch 150 and by a pre-heat relay 152 which has normally open contacts 153.

Control 98 also includes a three-position switch 154 which has two banks of three terminals each comprising a center terminal and upper and lower terminals, with reference to FIG. 2A. Switch 154, in the illustrated upper position which connects the center terminal to the upper terminal, places unit 20 under control of the microprocessor 96. The upper position provides voltage from conductor 128 to a conductor 155. An intermediate position of switch 154, in which the center terminal is not connected to either the upper terminal or the lower terminal, is selected when the microprocessor 96 is not utilized and the load in the conditioned space 90 is frozen. This switch position will cause unit 20 to operate continuously in a low speed cool mode. The lower position of switch 154 is selected when the microprocessor 96 is not utilized and the load in the conditioned space is fresh. This position of switch 154 will cause unit 10 to operate continuously, cycling between heating and cooling cycles under the control of the hereinbefore mentioned coil temperature switch 108. Coil temperature switch 108 is preset to close at a predetermined coil temperature, such as 35° F., to energize the pilot solenoid PS and initiate a heating cycle, and to open at a predetermined higher temperature, such as 38° F., to de-energize pilot solenoid PS and initiate a cooling cycle.

In addition to the relays already mentioned, control 98 includes a shutdown relay 156, a run relay 158, a heat relay 160, a high speed relay 162, a defrost damper relay 164, and a hot gas relay 166. Shutdown relay 156 is normally energized, and is de-energized to shut unit 10 down via its associated set of normally-closed contacts 168 which ground the protective switch SSW and cause it to open its contacts 134. The run relay 158 has normally-closed and normally open contacts 170 and 172, respectively, connected to a mode selector switch 174 which has an input connected to conductor 128. Selector switch 174 selects either a continuous operating mode in which the prime mover 28 operates continuously, or a cycling startstop mode, also called "cycle sentry", which includes starting and stopping the prime mover 28.

The normally-closed contacts 170 of run relay 158 are connected to the "continuous" position of selector switch 174, and the normally-open contacts 172 of run relay 158 are connected to the "cycling" position of selector switch 174. Contacts 170 or contacts 172 provide voltage to a conductor 175 from conductor 128 and selector switch 174.

Heat relay 160 has a set of normally open contacts 176 for controlling the pilot solenoid PS. High speed relay 162 has a set of normally open contacts 178 for controlling the high speed solenoid 120. Damper relay has a set of normally closed contacts 180 and a set of normally open contacts 182, connected to control a defrost damper solenoid 184. Hot gas relay 166 is provided for controlling the hot gas solenoid valve 77 via a set of normally open contacts 186, when a hot gas solenoid 77 is provided in hot gas line 74.

Control 98 also includes a engine coolant temperature switch (high water temperature -HWT) 190, which closes when the engine coolant reaches a predetermined elevated temperature, and a low oil pressure switch (LOPS) 192 which is open as long as engine pressure is normal. The closing of either switch 190 or 192 will shut unit 20 down via the manual reset switch SSW.

Microprocessor 96 senses the voltage across DC shunt 130 via conductors 194 and 196, and can thus determine the magnitude and polarity of battery current. One polarity, which will be called positive, indicates the battery 126 is being charged by alternator 138, which also indicates the prime mover 28 is running. The other polarity, i.e., negative, indicates the battery is discharging.

Microprocessor 96 also has a conductor 198 which senses the position of the low oil pressure switch 192, conductors 200 and 202 which sense the voltage level on first and second sides, respectively, of the high refrigerant cut-out switch 110, a conductor 204 which senses whether or not a modulation valve selector jumper 206 has connected conductor 204 to system ground 136, a conductor 208 which senses whether or not a defrost sensor switch 210 has operated, signifying the need for a defrost cycle, and a conductor 211 which detects voltage on the damper solenoid 184.

Microprocessor 96 has a plurality of output conductors for controlling various functions, including conductors 212, 214, 216, 218, 220, 222, 224 and 226 for respectively controlling the operation of start relay 146, pre-heat relay 152, shutdown relay 156, damper relay 164, high speed relay 162, run relay 158, heat relay 160, and hot gas relay 166. A conductor 228 is also provided for controlling the current level in the modulation valve 64.

Figure 3:
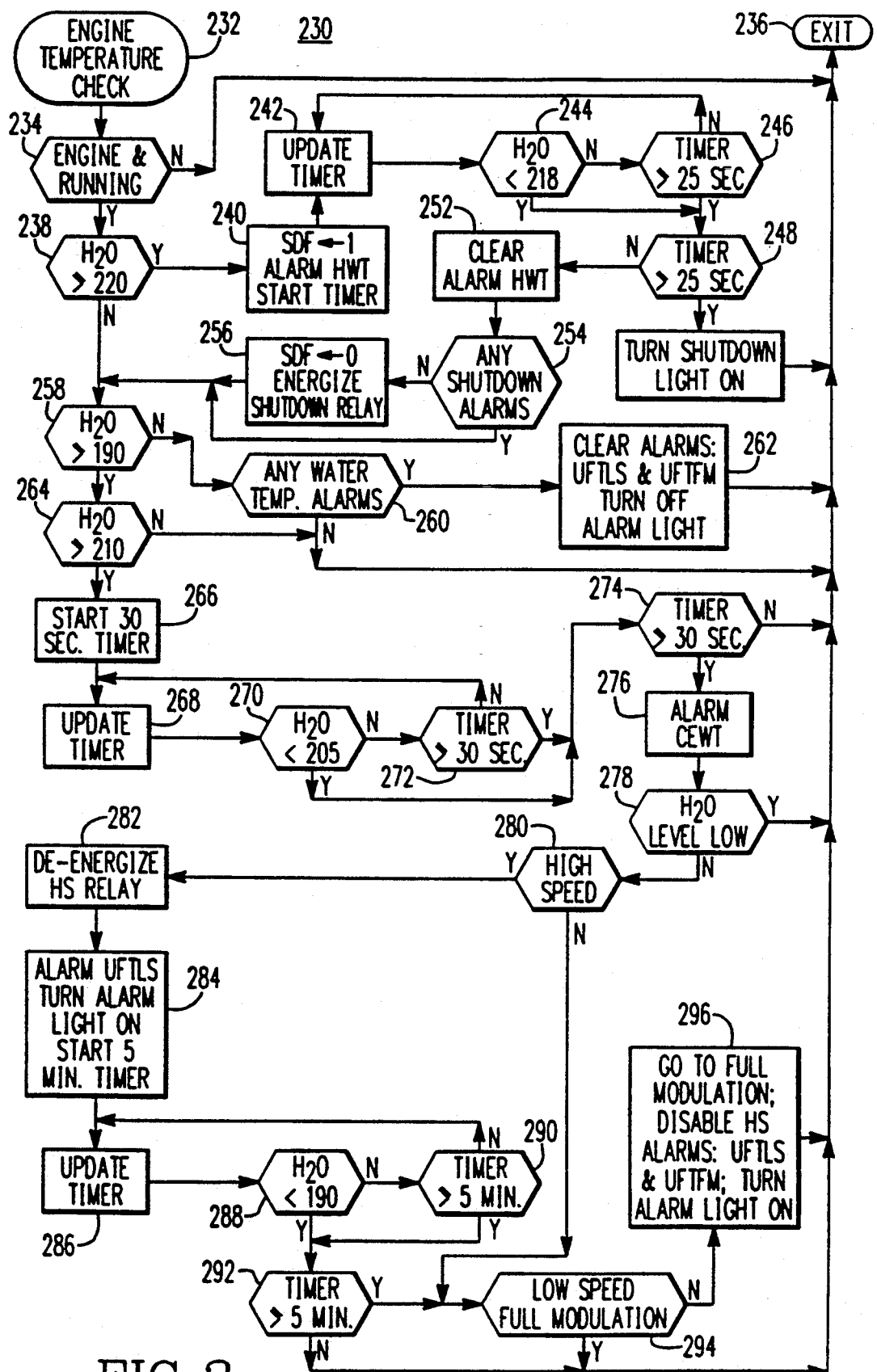
FIG. 3 is a flow diagram of a program which sets forth a microprocessor controlled temperature check of the internal combustion engine which drives the refrigerant compressor utilized in the transport refrigeration system.

Referring now to FIG. 3, there is shown an engine temperature monitoring program 230 which sets forth certain teachings of the invention. Program 230 is entered at 232 and step 234 determines if engine 30 has been selected as the prime mover, and if so, step 234 also determines if engine 30 running. If electric motor 32 has been selected as the prime mover, or engine 30 has been selected but it is not running, step 234 exits program 230 at 236.

If step 234 finds engine 30 is the prime mover, and engine 30 is running, step 238 determines if the temperature of engine 30 exceeds a predetermined maximum value. In the exemplary embodiment of the invention, engine 30 is liquid cooled and the temperature of engine 30 is monitored by water temperature sensor 116 shown in FIG. 2B. Other engine parameters which could be monitored to determine engine temperature include the temperature of the engine block and the temperature of the engine exhaust gases.

The predetermined maximum temperature value used in step 238 is selected such that if the water temperature exceeds this value, e.g., 220° F., it may not be necessary to run portions of program 230 related to detecting conditions which may lead to shutdown, as with an engine temperature above the selected maximum value, shutdown may be imminent.

If step 238 finds the water temperature above 220° F., step 240 sets a shutdown flag SDF true, which will result in the shutdown of engine 30, and thus unit 20, if program 230 is exited with flag SDF true. Step 240 also sets an alarm HWT, indicating with an appropriate code in display 125 the exact cause of shutdown, i.e., high engine water temperature.

Before exiting program 230 with SDF true, however, program 230 determines if the high engine water temperature is a transitory condition which will shortly drop to a safer level. To determine this, time is provided for the engine temperature to drop below a predetermined value, e.g., below 218° F. To implement this feature, step 240 also starts a timer, such as a software timer in RAM 124. Step 242 updates the timer and the program does not advance until either the engine temperature drops below 218° F., or a predetermined period of time has elapsed, e.g., 25 seconds.

More specifically, step 244 determines if the engine water temperature has dropped below 218° F., and step 246 detects when the timer started in step 240 reaches 25 seconds. Steps 218 and 246 loop back to the timer updating step 242 until either step 244 or step 246 find "yes" answers to the questions posed by the steps, and step 248 then determines whether the program arrived at this point via step 244 or step 246.

If the timer reached 25 seconds, the temperature did not drop below 218° during the 25 second time period, and the true shutdown flag SDF remains true as the program exits at 236 after step 250 turns on a shutdown indicating light on display 125.

If step 248 finds the timer did not reach or exceed 25 seconds, then step 244 found that the water temperature dropped below 218° F. Step 248 is then entered which clears the alarm HWT which was set in Step 240. Step 254 determines if there are any other active alarms which will, or have, shut unit 20 down. If there are no other shutdown alarms, step 256 sets the shutdown flag SDF false, and step 256 also energizes shutdown relay 156, in the event unit 20 had already been shut down. If step 254 finds some other shutdown alarms exist, they are allowed to remain, with both step 256 and the "yes" branch from step 254 going to step 258.

Step 258 determines if the engine water temperature is below a predetermined value, e.g., 190° F., with this value being a dividing line which separates normal engine temperature from a water temperature range which borders a temperature value which indicates a potential water temperature problem. If step 258 finds the water temperature is below 190° F., step 260 determines if there are any water temperature related alarms which have not been cleared. If there are, with the engine water temperature now below 190° F. these set alarms may be cleared. Accordingly, step 262 clears alarm UFTLS "unit forced to low speed", and it also clears alarm UFTFM "unit forced to full modulation". Step 262 then turns off the alarm light in display 125, and the program exits at 236.

If step 258 finds that the water temperature exceeds 190°, step 264 determines if the water temperature is high enough, e.g., 210° F., that modification of the operating mode of unit 20 should be considered, to prevent an eventual shutdown of unit 20 because of excessive engine temperature. If step 264 finds that the water temperature is between 190° and 210° F., the water temperature is still in a zone which does not require modification of the operating mode of unit 20, and the program exits at 236.

If the engine temperature continues to rise and a subsequent running of program 230 finds that the water temperature is equal to, or higher than 210°, then program 230 enters a phase to determine if the elevated engine water temperature is transitory. Step 266 starts a software timer in RAM 124, step 268 updates the timer, step 270 checks to see if the water temperature has dropped to, or below, a predetermined value below 210°, such as 205° F., and step 272 limits the amount of time which has been provided to determine if the engine water temperature is going to drop. Except for the values of the water temperature and time, steps 266, 268, 270 and 272 are similar to the hereinbefore described steps 240, 242, 244 and 246.

If the water temperature drops below 205, detected by step 270, or the timer reaches or exceeds 30 seconds, detected by step 272, the program arrives at step 274 which determines whether step 270 or step 272 caused the program to reach step 274. If the timer did not reach the predetermined value, e.g., 30 seconds, then the water temperature dropped below 205° F. and the program exits at 236. If the timer reached or exceeded 30 seconds, then the water temperature did not drop below 205° F. and step 274 goes to step 276 which sets an alarm "check engine water temperature" (CEWT).

In a preferred embodiment of the invention, before proceeding with the program portion devoted to finding modified operating modes which may keep unit 20 running, the engine water level is checked in step 278 via water level sensor 115, to determine if the level is below a predetermined safe level. Sensor 115 may simply be of the type which provides a signal when the water level is below a predetermined level. If the water level is low, as determined by step 278, then alternative operating modes will not be of benefit, and the program exits at 236. The hereinbefore described step 238 will eventually start the shutdown of engine 30 and unit 20, if the low water level problem is not corrected. Alarm CEWT, generated in step 276, will alert the operator to check the engine water level.

If step 278 does not find that the engine water level is low, then step 278 advances to step 280 which checks high speed relay 162 to determine if engine 30 is currently running at high speed, e.g., 2200 RPM, or low speed, e.g., 1400 RPM. If engine 30 is running at high speed, program 230 starts a first modification phase with step 282. Step 282 de-energizes high speed relay 162, and its normally open contacts 178 open to de-energize high speed solenoid 120 and drop engine 30 to the low speed setting. Step 284 then continues the first modification phase by setting the hereinbefore mentioned alarm UFTLS, which notifies the operator that the operation of unit 20 has been modified by forcing it to low speed. Step 284 also turns on the alarm indicator light in display 125, so the operator's attention will be directed to the alarm code portion of display 125.

Program 230 then provides time for the first phase modification to work, by setting a timer in step 284. The timer is updated in step 286. Step 288 detects the dropping of the engine water temperature into the safe range, i.e., below 190° F. Step 290 terminates the test period if the engine water temperature does not fall into the safe range after a predetermined period of time, e.g., 5 minutes. Step 292 determines whether step 288 or step 290 caused the program to break out of the loop which includes steps 286, 288 and 290. If step 292 finds that the water temperature dropped into the safe range, then the program exits at 236. The hereinbefore described step 262 will clear alarm UFTLS during the next running of program 230.

If step 292 finds that the timer reached 5 minutes, then the engine water temperature did not drop into the safe range, and program 230 starts a second modification phase to further modify the operation of unit 20 in an attempt to provide an operational mode which will prevent an eventual shutdown of unit 20 due to high engine water temperature. This second phase starts with step 294 which determines if the present operational mode is "low speed, full modulation". Full modulation indicates that suction line modulation valve 64 is fully closed, with full modulation reducing the load on engine 30. If the program arrived at step 294 from step 282, the operational mode should be "low speed", and the microprocessor checks to see if it is providing a signal which causes the modulation valve 64 to fully close. If suction line modulation valve 64 is fully closed, then unit 20 is already in low speed, full modulation, and the program exits at 236. If the engine water temperature continues to rise while unit 20 is in low speed, full modulation, then the hereinbefore described step 238 will eventually start shutdown of unit 20.

If step 294 finds that unit 20 is not in a low speed, full modulation operating mode, the second phase of the operating condition modification quest continues, with step 296 causing microprocessor to provide a current sinking path for current through modulation valve 64 which increases the modulation valve current to the magnitude required to fully close valve 64. Step 296 also disables the high speed relay 162, to prevent some other program from switching engine 30 to high speed. Step 296 also sets the hereinbefore mentioned alarms UFTLS and UFTFM, it turns the alarm indicator light in display 125 on, and the program exits at 236. As hereinbefore stated, if the operational mode modifications initiated by program 230 do not keep the water temperature from eventually reaching 220° F., the hereinbefore described step 238 will initiate the shutdown process.

If step 280 finds that engine 30 is already in low speed then the first modification phase is skipped, and the second modification phase is immediately entered, with step 280 going to the hereinbefore described step 294.

Figure 4:
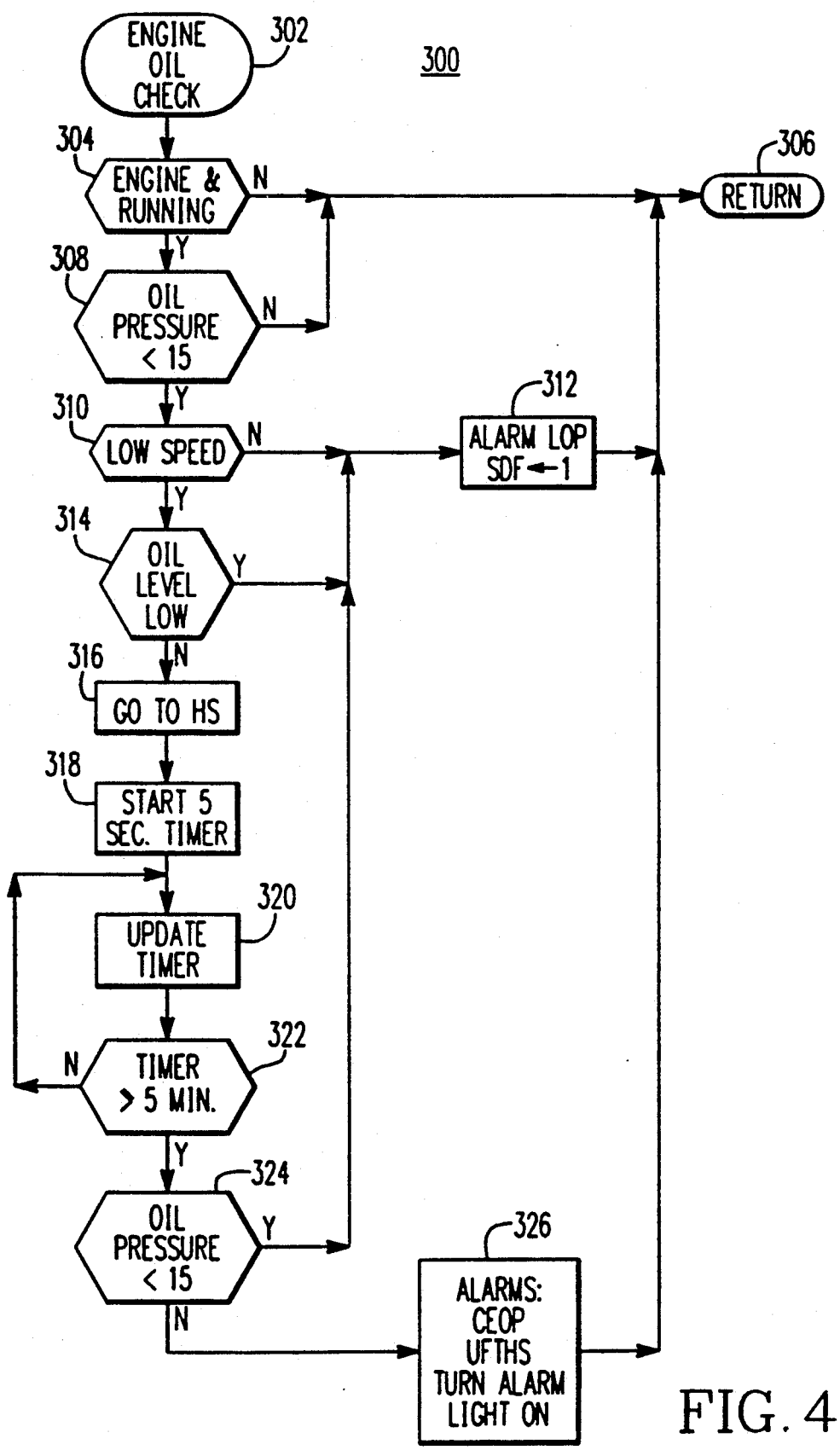
FIG. 4 is a flow diagram of a program which sets forth a microprocessor controlled oil pressure check of the internal combustion engine.

The methods of the invention also include monitoring engine oil pressure, with FIG. 4 setting forth a program 300 for monitoring engine oil pressure. Program 300 is entered at 302 and step 304 determines if engine 30 is the selected prime mover, and that it is running. If not, the program exits at 306.

If engine 30 is selected as the compressor prime mover, and engine 30 is running, step 308 checks to see if the engine oil pressure is below a predetermined value, e.g., 15 psi, which gives rise to concern. Oil pressure sensor 114 may be of the type which provides an input to microprocessor which indicates whether or not the engine oil pressure is below the predetermined value. If the engine oil pressure is not below 15 psi, the oil pressure is O.K. and program 300 exits at 306.

If step 308 finds that the engine oil pressure is below 15 psi, then step 310 determines if modification of the current operating mode of unit 20 may be beneficial. Step 310 checks the high speed relay 162 to determine if engine 30 is running at the low or high speed settings of the engine throttle. If engine 30 is running at high speed, then modification of the operating mode of unit 20 would not be beneficial, and step 312 sets alarm LOP, indicating low engine oil pressure. Shutdown flag SDF is also set true in step 312, as continued operation with low oil pressure may damage engine 30. Step 312 also turns on an alarm indicator light in display 125.

If step 310 finds that engine 30 is operating in low speed, then, if the oil level is not low, the engine oil pressure may possibly be raised by going to the high engine speed setting. Step 314 first checks the oil level sensor 112 in step 314 to detect a low oil level. Oil level sensor 112 may be of the type which provides a predetermined output when the engine oil level drops below a predetermined level. If oil level sensor 112 indicates that the oil level is low, then step 314 goes to step 312 to start the shutdown process.

If the oil level is not low, step 314 continues the modification phase of program 300 by going to step 316 which energizes high speed relay 162. Normally open contacts 178 of high speed relay 162 close, and high speed solenoid 120 is energized to move the engine throttle to the high speed setting. Program 300 then provides time for the engine oil pressure to increase after the switch from low to high engine speed, by starting a timer in step 318, updating the timer in step 320, and determining when a predetermined time period has elapsed, e.g., 5 seconds. After 5 seconds, step 324 checks oil pressure sensor 114 to determine if high speed engine operation has raised the engine oil pressure to, or above, the oil pressure setting, which is 15 psi in the example. If the modification of the operating mode from low speed to high speed did not raise the oil pressure out of the danger zone, then step 324 goes to the hereinbefore described step 312 to start the shutdown process.

If step 324 finds the engine oil pressure has been raised to, or above, 15 psi, then program 300 allows engine 30 to operate at high speed, exiting at 306 after setting alarms CEOP and UFTHS, and turning the on the alarm light in display 125. Alarm CEOP alerts the operator to check the engine oil pressure, and alarm UFTHS notifies the operator that the unit has been forced to high speed operation.

I claim:

1. A method of modifying the operation of a refrigeration unit when a condition is detected which may result in shutdown of the unit, with the refrigeration unit having a refrigerant compressor driven at low and high speeds by an internal combustion engine, with the engine including an oil pressure sensor, comprising the steps of:
   monitoring the oil pressure of the engine,
   detecting a predetermined low oil pressure condition,
   switching the engine to high speed when it is in low speed at the time the detecting step detects the predetermined low oil pressure condition,
   determining if the engine oil pressure has increased above a determined value after the step of switching to high speed,
   continuing to operate the engine at high speed when the determining step finds the engine oil pressure has increased above the predetermined value, and
   shutting the engine down when the determining step finds the engine oil pressure did not increase above the predetermined value.

2. The method of claim 1 including the step of providing time after the step of switching the engine to high speed, before initiating the step of determining if the engine oil pressure increased above the predetermined value.

3. The method of claim 1 wherein the engine has an oil level sensor, and including the steps of monitoring the level of the engine oil, and detecting when the oil level is below a predetermined level, with the step of switching the engine to high speed taking place only when the oil level of the engine is at or above the predetermined level.

* * * * *